Patented Sept. 3, 1935

2,013,338

UNITED STATES PATENT OFFICE 2,013,338

PROCESS FOR THE PRODUCTION OF CARBOXYLIC ACIDS

Gilbert B. Carpenter, Bellemoor, Del., assignor to E. I. du Pont de Nemours & Company, Wilmington, Del., a corporation of Delaware No Drawing. Application August 24, 1931, Serial No. 559,121

12 Claims. (Cl. 260—112)

This invention relates to the synthesis of organic compounds and particularly to the preparation of higher aliphatic acids by the interaction of an olefinic hydrocarbon and formic acid.

Aliphatic acids of the higher order such as propionic acid, butyric acid, etc., have been hitherto prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the important uses to which acids of this type are adaptable, many of which uses have not been exploited extensively due to the present high cost of the acids, it is obvious that a process for their preparation from materials, which are available and which will be even more available in the near future, will be of far reaching importance in this art.

It is an object of this invention to provide a process for the synthesis of the higher aliphatic carboxylic acids from olefinic hydrocarbons and formic acid. Another object of the invention is to provide a process for the preparation of propionic acid by the interaction of ethylene and formic acid. Other objects and advantages will hereinafter appear.

I have found that aliphatic acids of the higher order can be produced by the reaction of an olefinic hydrocarbon and formic acid. The olefinic hydrocarbons, which might otherwise be called aliphatic hydrocarbons containing a double bond, include, for example, the olefines ethylene, propylene, butylene, etc., and the diolefines such, for example, as butadiene, isoprene etc., the synthesis producing from the olefines propionic, butyric, and valeric acids respectively and from the diolefines various dicarboxylic acids. Thus, ethylene, for example, reacts with formic acid to give propionic acid:

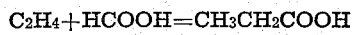
$$C_2H_4 + HCOOH = CH_3CH_2COOH$$

Propylene and butylene in an analogous manner yield butyric and valeric acids, respectively.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

When conducting the reaction in the vapor phase the relative proportions of the reactants can be varied although particularly advantageous results are obtained when the olefinic hydrocarbon is maintained at a fairly low concentration, say not much above 10%. High percentages of the hydrocarbon tend to result in its polymerization. Inert gases, such as nitrogen, carbon dioxide, etc., may be included with the reactants, this being advantageous in some cases from the standpoint of controlling the temperature of the exothermic reaction and limiting the extent thereof, where it may be desired to restrict the over-all conversion of the reactants for the sake of enhancing the relative yield of the desired acid. When employing an inert gas its concentration may reach 80% of the total gaseous mixture and in some instances even a higher percentage may be found to be advantageous.

When employing the higher molecular weight olefinic hydrocarbons such for example, as propylene, amylene etc., liquid phase operation under pressure is often of advantage. While working under such conditions catalysts soluble in the liquid mixture should generally be selected.

The use of pressures in excess of atmospheric, say from 25–900 atmospheres is preferred. The reaction proceeds over a wide range of temperatures, depending inter alia upon the hydrocarbon being used. Generally the desired reaction can be obtained at from 100–500° C. From the standpoint of practical operation the temperature should not be so low that the reaction rate is uneconomical nor so high as to result in undesirable by-products by decomposition and/or polymerization of the material. From this point of view the process has been found to operate satisfactorily at from 200–375° C.

The following example will illustrate one method of practising the invention, although the invention is not limited to the example.

*Example.*—A gaseous mixture containing 5 parts by volume of ethylene, and 10 parts by volume of vaporized formic acid, together with 85 parts by volume of nitrogen is passed at a pressure of 700 atmospheres and a temperature of 325° C. over a catalyst consisting of calcium iodide supported on activated charcoal. The catalyst may be prepared by dissolving 20 parts by weight of calcium iodide in 100 parts by weight of water and impregnating 100 parts by weight of activated charcoal therewith. After drying the water from the activated charcoal at a temperature of approximately 125° C. the catalyst is ready for use. The condensate obtained upon cooling the reacted gases will contain a good yield of aliphatic carboxylic acids including propionic acid.

While I prefer to carry out the reaction in the presence of a catalyst the reaction may, though with not as great efficiency, be conducted without the aid of a catalyst.

There are a large number of catalysts which are suitable for the reaction, such as the metallic halides used in the preparation of propionic acid from ethylene, carbon monoxide, and steam, as described in my copending applications Serial Nos. 559,122 and 559,130 now Patents Nos. 1,957,939 of May 8, 1934 and 1,924,766 of Aug. 29, 1933, respectively, e. g. the halides of the alkali and alkaline earth metals and the halides of zinc, cadmium, calcium etc., and the inorganic acid catalysts e. g. phosphoric, arsenic, etc.

The apparatus, which may be employed for conducting this reaction, may be of any conventional type and preferably one to which the temperature of the exothermic reaction can be controlled at the desired value. Owing to the corrosive action of the acids produced, the interior of the converter and conduit leading therefrom should be protected. This may be accomplished by using glass, or glass lined apparatus, or by coating the inner surface of the apparatus with chromium or silver or using for the construction of this equipment acid resisting alloys of, for example, molybdenum, cobalt, tungsten, chromium, manganese, and/or nickel.

Various changes may be made in the method hereinbefore described without departing from the invention or sacrificing the advantages thereof.

I claim:

1. A process of reacting an olefinic hydrocarbon and formic acid and thereby producing an aliphatic carboxylic acid, characterized in that the reaction is effected under a pressure within the range of 25–900 atmospheres.

2. A process of reacting an olefinic hydrocarbon and formic acid and thereby producing an aliphatic carboxylic acid, characterized in that the reaction is effected under a temperature of from 100–500° C.

3. A process of reacting ethylene and formic acid and thereby producing propionic acid, characterized in that the reaction is effected under a pressure within the range of 25–900 atmospheres.

4. A process of reacting ethylene and formic acid and thereby producing propionic acid, characterized in that the reaction is effected under a temperature within the range of 100°–500° C.

5. The process for the preparation of propionic acid which comprises reacting ethylene and formic acid in the presence of a calcium iodide catalyst supported on activated charcoal.

6. The process of producing aliphatic carboxylic acids which comprises reacting in the vapor phase an olefinic hydrocarbon and formic acid substantially in accordance with the equation:

$$C_nH_{2n} + HCOOH \rightarrow C_nH_{2n+1}COOH.$$

7. The process which comprises reacting in the vapor phase ethylene and formic acid and thereby producing propionic acid.

8. The process which comprises reacting in the vapor phase propylene and formic acid and thereby producing butyric acid.

9. The process which comprises reacting in the vapor phase butylene and formic acid and thereby producing valeric acid.

10. In a process for the preparation of aliphatic carboxylic acids the step which comprises reacting a gaseous mixture consisting essentially of an olefinic hydrocarbon and formic acid.

11. In a process for the preparation of aliphatic carboxylic acids the step which comprises passing into the reaction zone a gaseous mixture comprising an olefine and formic acid.

12. The process of producing aliphatic carboxylic acids which comprises reacting in the vapor phase an olefinic hydrocarbon and formic acid substantially in accord with the equation:

$$C_nH_{2n} + HCOOH \rightarrow C_nH_{2n+1}COOH$$

at a temperature within the range of 200–375° C. and at a pressure within the range of 25–900 atmospheres.

GILBERT B. CARPENTER.